(12) United States Patent
Schuetzle et al.

(10) Patent No.: US 11,859,135 B2
(45) Date of Patent: Jan. 2, 2024

(54) THERMALLY INTEGRATED PROCESS FOR THE PRODUCTION OF LIQUID FUELS WITH A SOLID OXIDE ELECTROLYZER

(71) Applicant: Infinium Technology, LLC, Sacramento, CA (US)

(72) Inventors: Robert Schuetzle, Sacramento, CA (US); Dennis Schuetzle, Grass Valley, CA (US); Anja Rumplecker Galloway, San Rafael, CA (US); James Bucher, Boston, MA (US)

(73) Assignee: Infinium Technology, LLC, Sacramento, CA (US)

( * ) Notice: Subject to any disclaimer, the term of this patent is extended or adjusted under 35 U.S.C. 154(b) by 0 days.

(21) Appl. No.: 18/445,018

(22) Filed: Mar. 2, 2023

(65) Prior Publication Data

US 2023/0287274 A1   Sep. 14, 2023

Related U.S. Application Data

(60) Provisional application No. 63/372,384, filed on Mar. 8, 2022.

(51) Int. Cl.
*C10G 2/00* (2006.01)
*C10L 1/08* (2006.01)
(Continued)

(52) U.S. Cl.
CPC ............. *C10G 2/32* (2013.01); *C10K 1/005* (2013.01); *C10L 1/06* (2013.01); *C10L 1/08* (2013.01); *C25B 1/042* (2021.01); *C25B 1/23* (2021.01); *C25B 9/19* (2021.01); *C25B 15/081* (2021.01); *C10G 2300/307* (2013.01); *C10G 2400/02* (2013.01); *C10G 2400/04* (2013.01); *C10G 2400/08* (2013.01); *C10L 2200/043* (2013.01); *C10L 2200/0423* (2013.01); *C10L 2200/0446* (2013.01); *C10L 2290/38* (2013.01); *C10L 2290/46* (2013.01)

(58) Field of Classification Search
CPC .. C10G 2/32; C10G 2400/02; C10G 2400/04; C10G 2400/08; C10G 2300/307; C25B 9/19; C25B 15/081; C25B 1/042; C25B 1/23; C10L 1/005; C10L 2290/38
See application file for complete search history.

(56) References Cited

PUBLICATIONS

G. Cinti, A. Baldinelli, A. Di Michele, and U. Desideri, Applied Energy 162 (2016) 308-320. "Integration of Solid Oxide Electrolyzer and Fischer-Tropsch: A sustainable pathway for synthetic fuel".*

* cited by examiner

*Primary Examiner* — Jafar F Parsa
(74) *Attorney, Agent, or Firm* — McKinney Law Group APC; Jeffrey A. McKinney

(57) ABSTRACT

Production of fuels from low carbon electricity and from carbon dioxide by the use of a solid oxide electrolysis cell (SOEC) and Fischer-Tropsch is shown. Fischer-Tropsch is an exothermic reaction that can be used to produce steam. Steam produced from the Liquid Fuel Production (LFP) reactor system, where the Fischer-Tropsch reaction occurs, is used as feed to the SOEC. The higher temperature steam improves the efficiency of the overall electrolysis system. The integration of the LFP steam improves the efficiency of the electrolysis because the heat of vaporization for the liquid water does not have to be supplied by the electrolyzer.

10 Claims, 2 Drawing Sheets

(51) Int. Cl.
*C10K 1/00* (2006.01)
*C25B 1/23* (2021.01)
*C25B 1/042* (2021.01)
*C25B 9/19* (2021.01)
*C25B 15/08* (2006.01)
*C10L 1/06* (2006.01)

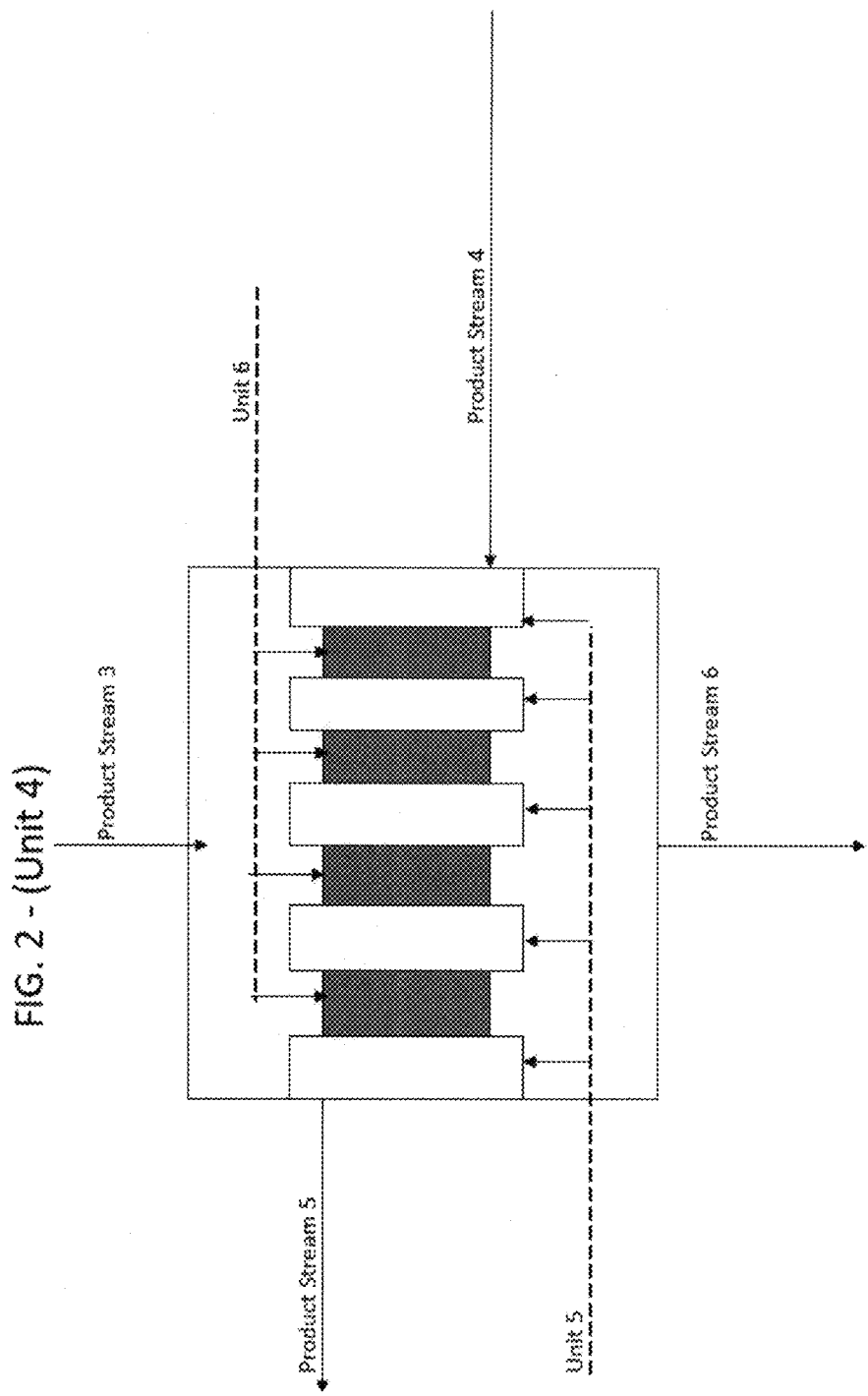

THERMALLY INTEGRATED PROCESS FOR THE PRODUCTION OF LIQUID FUELS WITH A SOLID OXIDE ELECTROLYZER

CROSS-REFERENCE TO RELATED APPLICATION

This application claims priority benefit of U.S. Provisional Patent Application No. 63/372,384, filed Mar. 8, 2022, the entire content of which is hereby incorporated by reference into this document.

FIELD OF THE INVENTION

Production of liquid hydrocarbon fuels from hydrogen and carbon monoxide produced in a solid oxide electrolyzer by thermally integrating the electrolyzer with liquid fuel production process.

BACKGROUND OF THE INVENTION

The increase in global atmospheric carbon dioxide concentrations has been linked to changes in the earth's climate. The combustion of fossil fuels in various engines produces atmospheric carbon dioxide. Concerns about climate change have led to significant societal changes toward renewable or low carbon electricity. This has also led to increasing activity to decarbonize the transport sector of the economy. As a result, we see increases in the use of electric vehicles that are powered by renewable electricity to aid in decarbonization of the transport sector. Heavy transport and aviation are some of the most carbon intensive transportation sectors. Efficient and economical production of low carbon fuels, diesel and sustainable aviation fuel, could lead to significant reductions in the carbon dioxide emissions by the heavy transport and the aviation sectors.

BRIEF SUMMARY OF THE INVENTION

Production of fuels from low carbon electricity and from carbon dioxide by the use of a solid oxide electrolysis cell (SOEC) is demonstrated. FIG. 1 shows the integrated process for the production of liquid fuels. Fischer-Tropsch is an exothermic reaction that can be used to produce steam. Steam produced from the Liquid Fuel Production (LFP) reactor system, where the Fischer-Tropsch reaction occurs, is used as feed to the Solid Oxide Electrolysis Cell. The higher temperature steam improves the efficiency of the overall electrolysis system. The steam improves the efficiency of the electrolysis because the heat of vaporization for the liquid water does not have to be supplied by the electrolyzer.

DESCRIPTION OF RELATED ART

Several previous patent applications deal with the production of fuels and chemicals from carbon dioxide and low carbon fuel including U.S. patent application Ser. No. 17/300,259, U.S. patent application Ser. No. 17/300,260, U.S. patent application Ser. No. 17/300,262, and U.S. patent application Ser. No. 16/873,561. Each application is incorporated by reference in its entirety. However, each of these applications does not deal specifically with the integration process with a Solid Oxide Electrolyzer (SOE).

Cinti et al (Ref. 1) deals with an integration of fuels production with an SOEC but without the thermal integration process and the associated improvement in efficiency shown in this patent application.

BRIEF DESCRIPTION OF THE DRAWINGS

FIG. 2 shows the multi-tubular fixed bed liquid fuels production reactor.

DETAILED DESCRIPTION OF THE INVENTION

Figure 1:
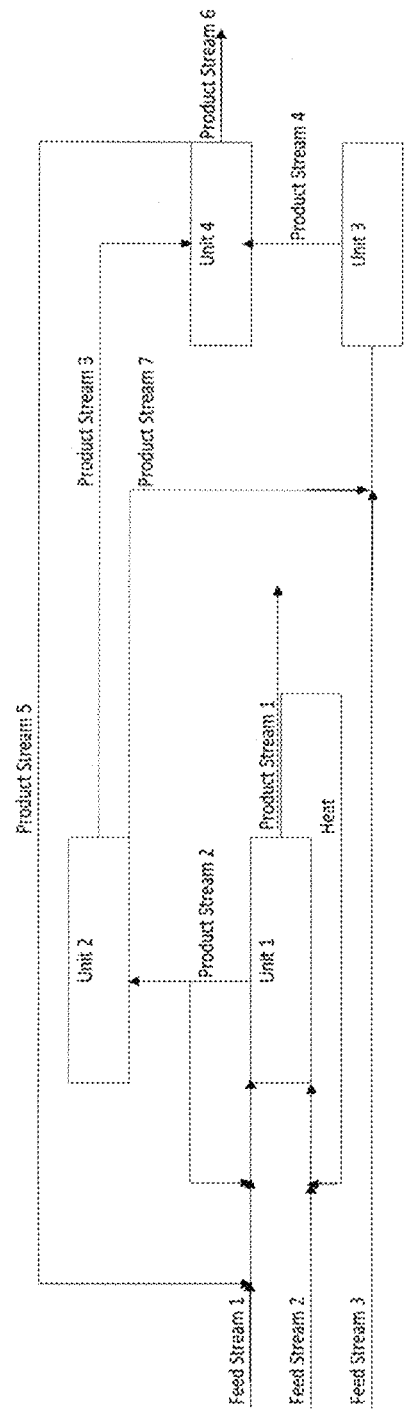
FIG. 1 shows the integrated process for the production of liquid fuels.

FIG. 1 shows the integration process for the production of liquid fuels. Unit 1 is a Solid Oxide Electrolyzer (SOE) or a Solid Oxide Electrolysis Cell (SOEC). Unit 1 is a high temperature electrolyzer that operates at temperatures from 550° C. to 900° C. The SOEC operates at ambient or near ambient pressure. Higher pressure operation is possible with improvements in the stack sealing. In an SOEC, electricity is fed to the system to drive electrochemical reactions. In this SOEC, the electricity used is low carbon electricity including electricity produced from wind, solar, nuclear, or hydro power. The SOEC comprises a cathode and an anode with an electrolyte. The reactants are fed to the SOE cathode, which is the electrode where reduction takes place. The anode is the electrode where oxygen is obtained.

In the SOEC, water is split into hydrogen and oxygen ions at the cathode. The oxygen ions diffuse across a ceramic membrane, and oxygen is produced at the anode by combination of oxygen ions using heat and electrochemical gradients as driving force. See equation 1 below. When carbon dioxide is also supplied, co-electrolysis takes place, and the carbon dioxide is reduced and produces carbon monoxide at the cathode and oxygen at the anode. See equation 2 below.

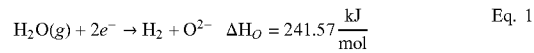

$$H_2O(g) + 2e^- \rightarrow H_2 + O^{2-} \quad \Delta H_O = 241.57 \frac{kJ}{mol} \qquad \text{Eq. 1}$$

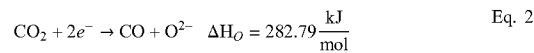

$$CO_2 + 2e^- \rightarrow CO + O^{2-} \quad \Delta H_O = 282.79 \frac{kJ}{mol} \qquad \text{Eq. 2}$$

$\Delta H_O$ is the energy (enthalpy) necessary for the reaction(s) at standard temperature of 25° C. Both reactions are endothermic and require the addition of energy to be completed. $\Delta H$ is adjusted for the operating temperature of the SOEC. It should be noted that Eq. 1 is for gaseous water or steam as the feedstock. If the water is in the liquid state, then $\Delta H_O$=285.84 kJ/mol.

Eq. 3 shows the relationship between the enthalpy and the Gibbs Free Energy. The Gibbs free energy is the electrical work depending on the reversible potential between the cell electrodes ($E_{rev}$, Eq. 4). Entropy is supplied in the form of heat. When the irreversible thermal losses are equivalent to the heat demand, the energy balance is obtained, and energy equilibrium takes the name of thermoneutral, $E_{tn}$.

$$\Delta H = \Delta G + T\Delta S \qquad \text{Eq.3}$$

$$\Delta G = \Delta H/zF \; E_{rev} \qquad \text{Eq.4}$$

$$E_{tn} = \frac{\Delta H}{zF} = E_{rev} + \frac{T\Delta S}{zF} \qquad \text{Eq. 5}$$

The SOEC efficiency (Eq. 6) is calculated as the ratio between chemical energy exiting the system, in terms of enthalpy and the electrical energy fed from the outside ($E_e$).

$$\eta = \frac{\Delta H}{E_e} \qquad \text{Eq. 6}$$

Where $E_e$ is the electrical energy input equal to the current (z * F) multiplied by the operating potential E. The efficiency is equal to 1 at the thermoneutral conditions where all electrical energy and relative heat losses are converted into chemical energy.

As seen in FIG. 1, the SOEC Unit 1 cathode is fed by Feed Stream 1 that consists of carbon dioxide. Feed stream 1 is mixed with a recycled Product Stream 5 that comprises water vapor (steam) produced as part of the heat management/steam system of Unit 4, liquid fuel product reactor. This becomes the cathode feed stream. Additional steams can also be added to make the combined cathode feed stream. These additional streams may contain optional hydrogen. Hydrogen is useful as a co-feed to keep the cathode in reduction mode. Hydrogen can be recycled from the SOEC cathode product or can be produced in other areas of the facility including hydrogen that is produced in a hydrocarbon reforming unit from light hydrocarbons produced in unit 4. Additionally, light hydrocarbons produced in the Unit 4 (LFP) can also be part of the cathode feed.

The fuel electrode (cathode) material is a Ni doped YSZ. However, high steam partial pressures and low hydrogen partial pressures at the Ni-YSZ interface often causes oxidation of the nickel which results in catalyst degradation. The hydrogen in the cathode feedstock can aid in overcoming this problem. Instead of, or in addition to Ni-YSZ as a cathode material, there are perovskite-type lanthanum strontium manganese (LSM) and lanthanum strontium manganese chromate (LSCM) that can be used instead of or in combination with Ni-YSZ.

On the anode side, the oxygen ions are produced in Eq. 1 and Eq. 2. In an SOEC, it is beneficial to use a sweep gas over the anode to sweep the anions (and oxygen gas) away from the anode. Feed stream 2 in FIG. 1 is the sweep gas stream that goes to the anode. The sweep gas can be chosen from several gases. The sweep gas can be chosen from air or steam. The Product Stream 1 is an oxygen rich gas with an oxygen percentage above the oxygen content of air when air is used as the sweep gas. The anode materials can be chosen from a number of materials including lanthanum strontium manganate (LSM), Gd-doped $CeO_2$ impregnated LSM, and neodymium nickelate or combinations thereof.

The electrolyte used in the SOEC is a dense ionic conductor consisting of $ZrO_2$ doped with 8 mol % Y2O3 (also known as YSZ). Zirconia dioxide is used because of its high strength, high melting temperature (approximately 2700° C.) and excellent corrosion resistance. Other electrolyte materials include Scandia stabilized zirconia (ScSZ), ceria-based electrolytes or lanthanum gallate materials. All materials can be used separately or in combinations.

Product stream 2 or the hot cathode product comprises hydrogen and carbon monoxide. The product stream leaves the cathode at the SOEC operating temperature of 550 to 900° C. The product stream can be used to heat the incoming cathode feed via a feed/product heat exchanger. The cathode feed stream comprises steam and carbon dioxide.

Product stream 1 is the hot anode product stream that comprises oxygen or an oxygen-enriched sweep gas. The product stream leaves the cathode at the SOEC operating temperature of 550 to 900° C. The product stream can be used to heat the Feed Stream 2 or incoming anode feed via a feed/product heat exchanger.

The cooled Product Stream 2 or cathode product comprises synthesis gas. The steam goes to Unit 2 or the syngas conditioning unit. The syngas conditioning block is actually a collection of a number of unit operations. It includes additional cooling, water removal, adjustment of the hydrogen to carbon monoxide ratio, carbon dioxide removal, and compression to raise the pressure to the Unit 4 (LFP reactor). This produces a Product Stream 3 that becomes the LFP Feed stream that comprises syngas with a hydrogen to carbon monoxide molar ratio of 1.5 to 2.5, or more preferably 2.0 to 2.2. Besides the hydrogen and carbon monoxide in product stream 2, other components are likely in the stream including unreacted carbon dioxide, unreacted hydrogen, and water. Water is removed in a flash drum. The water removed becomes Product Stream 7 in FIG. 1 and can be optionally recycled to the liquid water that can be blended into Feed Stream 3.

If the hydrogen to carbon monoxide ratio in the syngas conditioning unit feed is greater than 2.2, excess hydrogen can be removed from the stream by any know hydrogen removal system such as pressure swing adsorption (PSA), hydrogen membranes, or other methods. The excess hydrogen containing stream can be recycled to the front end of the process to supplement the Unit 1, and blended SOEC Cathode feed. If the hydrogen to carbon monoxide is less than 2.0, additional hydrogen can be produced by the water gas shift reaction (Eq. 7).

$$H_2O + CO \leftrightarrow H_2 + CO_2 \qquad \text{Eq. 7}$$

If required to meet the syngas composition specification, a catalytic reactor can be used to convert some of the CO to additional hydrogen.

Removal of carbon dioxide in the syngas is useful as carbon dioxide is a diluent in downstream processing. Carbon dioxide removal is done by any of a number of different processes including: 1) amine absorbers, 2) Rectisol or methanol absorbers, 3) Other physical absorbers like Solexol, 4) Cryogenic $CO_2$ fractionation. The captured and removed $CO_2$ will result in a CO2 stream that can be sent back to the front end of the process to add to the Feed Stream 1.

The operating pressure of the SOEC is near ambient pressure. Unit 4, the LFP reactor operates at pressures of 250 to 450 psig. The syngas conditioning block, unit 2, comprises a syngas compressor. This will be a multi-stage compressor system with interstage cooling.

Unit 2 produces a Product Stream 3 that is the feed stream to Unit 4. Unit 4 is the Liquid Fuel Production (LFP) reactor. FIG. 2 refers to the details of the LFP reactor. The LFP feed stream comprising hydrogen and carbon monoxide enter the LFP reactor. The LFP reactor is a multi-tubular fixed bed reactor that allows the Fischer-Tropsch (F-T) reaction of Eq. 8.

$$nCO + (2n+1)H_2 \rightarrow C_nH_{2n+2} + nH_2O \qquad \text{Eq. 8}$$

$$\Delta H_0 = -165 \frac{kJ}{mol\ CO}$$

The F-T reaction is exothermic with a standard enthalpy of reaction released of 165 kJ/mol of CO converted. The high heat of reaction makes control of the F-T reactor temperature critical. If uncontrolled, the temperature rise in the reactor would result in higher methane production and higher catalyst deactivation. As such control of the temperature is important. Ideally the temperature of the F-T reactor is maintained at 200 to 240° C.

The multi-tubular fixed bed reactor of FIG. 2 aids in the control of the temperature of the F-T reactor. Syngas is fed to the reactor and is split to go through the tubular catalytic reactors (Unit 6 in FIG. 2). The syngas reactor produces a mixture primarily consisting of alkanes, alkenes, and alcohols as shown by the F-T reaction (Eq. 8). The mixed hydrocarbons, Product Stream 6, leaves the tubular reactor.

Feed stream 3, comprising liquid water, is fed to Unit 3'(FIG. 1). This stream can optionally include water that is separated out from Unit 2, syngas conditioning unit. Unit 3 comprises water purification, treatment, and pumping. Purification can include reverse osmosis or other purification systems. Treatment of the water includes addition of chemicals, de-ionization, etc. The water is pumped to a pressure of 100 to 300 psig and preferably about 200 psig to produce product stream 4. Pressurized and treated cooling water, Product Stream 4, is fed into Unit 5, the boiler portion of the multi-tubular reactor. The tubular catalytic reactors are surrounded by the Unit 5 boiler (FIG. 2). The heat of reaction supplies the heat that allows the vaporization of the liquid water to steam. In some embodiments of the invention, a mixture of steam and liquid water are fed to Unit 5 that allows some of the liquid water to additional steam. In some embodiments, a mixture of steam and liquid water leave Unit 5. A steam drum is used to separate the water and steam. The liquid water is recirculated as feed to the Unit 5 boiler. The steam produced in Unit 5 boiler is Product Stream 5 steam that is sent back to the front end and mixed with feed stream 1 and becomes feed to Unit 1, SOEC. The ratio of liquid water to steam is typically about 0.5 but can range from 0.2 to 0.7.

The hydrocarbon product from the LFP reactor is further processed downstream of the Unit 4 LFP reactor. Water is also produced in the F-T reaction (Eq. 8). Water can be removed from the F-T product stream by a flash drum. The recovered water can also be recycled back to the liquid water processing, Unit 3, in FIG. 1. The light hydrocarbons are also separated from the LFP hydrocarbon product which are primarily alkanes and alkenes with carbon numbers of one to five. The LFP reactor product that contains the desired $C_5$-$C_{23}$ hydrocarbons can be further processed in a separation system. The separation system can include distillation. The desired $C_5$-$C_{23}$ products can be used for gasoline blendstock, diesel fuel, jet fuel, or used as low-carbon chemicals that can displace chemicals derived from petroleum or natural gas. In one embodiment, the LFP product is sent to a series of fractionators are used to create a high cetane diesel fuel with an adjustable flash point between 32-50° C. (90-122° F.) and a stabilized naphtha (potentially a gasoline blend stock or chemical feedstock). A basic arrangement for these columns, which include:

A) Wax Stripper—This unit uses steam to recover fuel-range components from the waxy material. The overhead fuel-range components and steam are sent to the Main Fractionator while the stripped wax is sent to heated storage for sales. The Wax Stripper is a column without a condenser or reboiler, operating at approximately 170° C. (340° F.) and with enough pressure, 2.75 barg (40 psig), for the overhead vapors to enter the Main Fractionator column.

B) Main Fractionator—This column splits the raw fuel into naphtha and diesel range components to control the diesel flash point. This column includes a high pressure (HP) steam heated reboiler, and an external condenser with 3-phase separation for removing absorbed water and steam from the wax stripper feed.

C) Optional Naphtha Stabilizer to control the Reid vapor pressure (RVP) to a spec of 8 psia. The stabilizer includes a low pressure (LP) steam reboiler, and an integrated knock-back, water-cooled condenser.

D) Optional Diesel Cold-Flow/Kerosene vacuum column to adjust the diesel pour point for cold weather sales and/or produce a kerosene cut. The feed is heated to 300° C. (570° F.). The column is 20 stages with an overhead condenser pressure of 6 psia. The kerosene cut may be used as jet fuel component. Under certain conditions the kerosene cut may meet the ASTM specification (ASTM D7566) for use as a jet fuel.

In one embodiment of the invention, the kerosene cut of the LFP product does not meet all the ASTM D7566 specification for use as jet fuel. Jet fuel may have a higher value than diesel fuel in certain circumstances. It may be necessary to hydroprocess the LFP product or a fraction of the LFP product such as LFP kerosene or LFP light diesel to meet the specification for use as jet fuel or sustainable aviation fuel (SAF). The hydroprocessing includes the hydroisomerization of the $C_9$-$C_{15}$ alkanes produced in the LFP reactor. The LFP product or a fraction of the product is pressurized and mixed with a stream comprising hydrogen. The hydrogen can be produced from the electrolysis of water or from the reforming of natural gas or from the gasification of waste or biomass. It is preferred that the hydrogen is a low carbon hydrogen.

The combined stream comprising hydrogen and at least a portion of the LFP product is then heated and fed to the hydroprocessing reactor. The hydroprocessing reactor operates at an elevated pressure of greater than 100 psig but generally less than 2000 psig. The hydroprocessing reactor operates at a temperature between 250° C. and 400° C. Effluent from the hydroprocessing reactor is cooled before entering the hot separator where gas and liquid are separated in hot and cold separators.

The hydrocarbon products from the hot and cold separators are sent to the fractionation section where the light-ends and hydrocarbon products are separated. This fraction system may include a wax stripper and main fractionator as well as a naphtha stabilizer and a kerosene vacuum column. The fractionators are operated in a manner such that the kerosene stream will meet the specifications of ASTM D7566 and is useful as a Sustainable Aviation Fuel (SAF).

The following examples illustrate some aspects of the invention.

EXAMPLE 1

In this example, 1000 mol/s of liquid water and 500 mol/s of carbon dioxide are fed to an SOEC. 800 mol/s of hydrogen and 400 mol/s of carbon monoxide are produced. Using the heat requirements for the reactions of Eq. 1 and Eq. 2 with liquid water as a feedstock, a minimum electrical demand for the SOEC stack can be calculated. In this example, the minimum electrical requirement is 401.3 MW.

EXAMPLE 2

In this example, 1000 mol/s of steam produced in the LFP reactor Unit 5 boiler are fed to the SOEC instead of the liquid water in example 1. 800 mol/s of hydrogen and 400 mol/s of carbon monoxide are produced in the SOEC. Using the heat requirements for the reactions of Eq. 1 and Eq. 2 with steam as a feedstock, a minimum electrical demand for the SOEC can be calculated. In this example, the minimum electrical requirement is 360.4 MW.

Table 1 shows the improvement of Example 2 versus Example 1. The use of steam saves 40.9 MW of electricity and shows a 10.2% improvement in electricity required by the SOEC.

The amount of steam that can be produced in the LFP reactor boiler drastically reduces the feed water required for the SOEC. Table 2 below highlights the overall process improvements. With a 50% single pass CO conversion in the LFP reactor, the amount of reaction heat released is equal to 33.0 MW. That amount of reaction heat can produce 745.4 mol/s of steam from water. The remaining 245.3 mol/s required by the SOEC can be partially supplied by recycle of unconverted steam.

TABLE 1

Comparison of Use of Liquid Water vs LFP

| Steam | Example 1 | Example 2 |
|---|---|---|
| SOEC Feed Streams | | |
| Liquid water, mol/s | 1000 | 0 |
| Steam, mol/s | 0 | 1000 |
| Carbon Dioxide, mol/s | 500 | 500 |
| SOEC Product Streams | | |
| Hydrogen, mol/s | 800 | 800 |
| Carbon Monoxide, mol/s | 400 | 400 |
| Minimum Electricity Requirement, MW | 401.3 | 360.4 |
| Electrical Use Improvement, MW | | 40.9 |
| Percent Improvement | | 10.2% |

TABLE 2

Steam Production in LFP for Example 2

| Single pass F-T LFP CO Conversion | 50% |
|---|---|
| Reaction Heat Produced, MW | 33.0 |
| Steam Production in LFP, mol/s | 745.4 |
| Makeup water required for SOEC, mol/s | 245.3 |
| Reduction in Water Consumption | 74.5% |

REFERENCES

1. G. Cinti, A. Baldinelli, A. Di Michele, and U. Desideri, Applied Energy 162 (2016) 308-320. "Integration of Solid Oxide Electrolyzer and Fischer-Tropsch: A sustainable pathway for synthetic fuel".
2. U.S. patent application Ser. No. 17/300,259.
3. U.S. patent application Ser. No. 17/300,260.
4. U.S. patent application Ser. No. 17/300,262.
5. U.S. patent application Ser. No. 16/873,561.

The invention claimed is:

1. A process for the production of liquid fuels comprising:
   a. a first electrolysis feed stream comprising steam is fed to a solid oxide electrolyzer;
   b. a second electrolysis feed stream comprising carbon dioxide is fed to a solid oxide electrolyzer,
   c. low carbon electricity is used in the solid oxide electrolyzer to produce a first electrolysis product stream comprising a mixture of hydrogen and carbon monoxide and a second electrolysis product stream comprising an oxygen-enriched sweep gas;
   d. the first electrolysis product steam is cooled to a temperature of less than 200° C. to produce a cooled syngas stream;
   e. the cooled syngas stream is fed to a syngas conditioning block to produce a syngas conditioning product stream comprising hydrogen and carbon monoxide where the molar ratio of hydrogen to carbon monoxide is between 2.0 and 2.2 with a pressure of between 250 psig and 400 psig;
   f. the syngas conditioning product stream is fed to a liquid fuel production reactor wherein an exothermic chemical reaction allows the conversion of hydrogen and carbon monoxide to liquid fuel production reactor product comprising a liquid hydrocarbon comprising alkanes with carbon numbers from 5 to 23;
   g. wherein the liquid fuel production reactor comprises:
      i. a tubular fixed bed catalytic reactor and wherein the tubular fixed bed catalytic reactor allows a Fischer-Tropsch reaction;
      ii. a steam boiler surrounds the tubular fixed bed catalytic reactor and the boiler is filled with a mixture of steam and liquid water wherein the boiling of the liquid water allows heat to be removed from the tubular fixed bed catalytic reactor and the boiler produces a medium pressure steam;
   h. wherein at least a portion of the medium pressure steam is used as the first electrolysis feed stream.

2. The process of claim 1, wherein the solid oxide electrolyzer operates at temperatures from 550° C. to 900° C.

3. The process of claim 1, wherein the solid oxide electrolyzer operates at ambient pressure.

4. The process of claim 1, wherein the solid oxide electrolyzer comprises a cathode, and wherein the cathode is a Ni doped NSZ.

5. The process of claim 1, wherein the solid oxide electrolyzer comprises an anode, and wherein the anode is lanthanum strontium manganate, Gd-doped $CeO_2$ impregnated with lanthanum strontium manganate, neodymium nickelated or combinations thereof.

6. The process of claim 1, wherein carbon dioxide removal is performed on the cooled syngas stream fed into the syngas conditioning block.

7. The process of claim 1, wherein the liquid hydrocarbon comprising alkanes with carbon numbers from 5 to 23 is further processed in a separation system.

8. The process of claim 1, wherein the liquid hydrocarbon is sent to a series of fractionators used to create a high cetane diesel fuel and a stabilized naphtha.

9. The process of claim 1, wherein the syngas conditioning block comprises a syngas compressor, wherein the syngas compressor is a multi-stage compressor system with interstage cooling.

10. The process of claim 1, wherein light hydrocarbons are separated from the liquid hydrocarbon comprising alkanes with carbon numbers from 5 to 23 are used for gasoline blendstock, diesel fuel or jet fuel.

* * * * *